US012451653B2

(12) United States Patent
Guo et al.

(10) Patent No.: US 12,451,653 B2
(45) Date of Patent: Oct. 21, 2025

(54) PULL STRAP CONNECTOR AND ASSEMBLY THEREOF WITH IMPROVED LOCKING FEATURES

(71) Applicant: LUXSHARE TECHNOLOGIES INTERNATIONAL, INC., Milpitas, CA (US)

(72) Inventors: Rongzhe Guo, Dongguan (CN); Yiheng Lin, Dongguan (CN); Hongji Chen, Dongguan (CN); Yang Xu, Dongguan (CN)

(73) Assignee: LUXSHARE TECHNOLOGIES INTERNATIONAL, INC., Milpitas, CA (US)

( * ) Notice: Subject to any disclaimer, the term of this patent is extended or adjusted under 35 U.S.C. 154(b) by 449 days.

(21) Appl. No.: 17/958,829

(22) Filed: Oct. 3, 2022

(65) Prior Publication Data

US 2023/0112949 A1 Apr. 13, 2023

(30) Foreign Application Priority Data

Oct. 12, 2021 (CN) ......................... 202122460467.2

(51) Int. Cl.
*H01R 12/71* (2011.01)
*H01R 13/516* (2006.01)
(Continued)

(52) U.S. Cl.
CPC ....... *H01R 13/6335* (2013.01); *H01R 12/716* (2013.01); *H01R 13/516* (2013.01); *H01R 13/639* (2013.01)

(58) Field of Classification Search
CPC .............. H01R 13/6335; H01R 12/716; H01R 13/516; H01R 13/639; H01R 12/771; H01R 13/6594; H01R 13/6275
See application file for complete search history.

(56) References Cited

U.S. PATENT DOCUMENTS 5,967,810 A * 10/1999 Spickler ............... H01R 13/635 439/159
7,402,070 B1 * 7/2008 Wu .................... H01R 13/6275 439/352

(Continued)

FOREIGN PATENT DOCUMENTS

CN 210779276 U 6/2020
CN 210897834 U 6/2020
CN 211351144 U 8/2020

*Primary Examiner* — Truc T Nguyen

(74) *Attorney, Agent, or Firm* — Birch, Stewart, Kolasch & Birch, LLP

(57) ABSTRACT

A pull strap connector includes an insulating housing, a number of conductive terminals, a movable element, an elastic member, and a pull strap. The insulating housing includes a main body and a tongue plate. The main body includes a first end wall and a second end wall. The movable element includes at least one first locking protrusion protruding forwardly from the first end wall for engaging with a first locking hole of a mating connector. The movable element includes at least one ejector rod. The movable element includes at least one second locking protrusion on a rear end of the ejector rod. The second locking protrusion protrudes forwardly towards the second end wall for engaging with a second locking hole of the mating connector. The pull strap is configured to drive the movable element to overcome the elastic member so that the movable element moves along a front-back direction.

20 Claims, 13 Drawing Sheets

(51) Int. Cl.
*H01R 13/633* (2006.01)
*H01R 13/639* (2006.01)

(56) References Cited

U.S. PATENT DOCUMENTS

| | | | | |
|---|---|---|---|---|
| 7,422,457 | B1 * | 9/2008 | Wu | G02B 6/4261 439/258 |
| 7,445,485 | B1 * | 11/2008 | Wu | H01R 13/633 439/372 |
| 2003/0194899 | A1 * | 10/2003 | Ueda | H01R 13/6272 439/357 |
| 2010/0216325 | A1 * | 8/2010 | Huang | H01R 13/6275 439/155 |
| 2012/0058652 | A1 * | 3/2012 | Wang | H01R 13/6335 439/76.1 |
| 2014/0335711 | A1 * | 11/2014 | Lamb | B60L 3/04 439/258 |
| 2017/0205591 | A1 * | 7/2017 | Takano | G02B 6/3825 |
| 2020/0096716 | A1 * | 3/2020 | Takano | G02B 6/3825 |
| 2022/0407263 | A1 * | 12/2022 | Guo | H01R 13/6275 |
| 2023/0034099 | A1 * | 2/2023 | Chen | H01R 13/639 |
| 2025/0015540 | A1 * | 1/2025 | Cheng | H01R 13/635 |
| 2025/0015542 | A1 * | 1/2025 | Zeng | H01R 13/635 |
| 2025/0023265 | A1 * | 1/2025 | Cheng | H01R 13/629 |
| 2025/0023266 | A1 * | 1/2025 | Cheng | H01R 13/6471 |
| 2025/0023299 | A1 * | 1/2025 | Cheng | H01R 12/75 |

* cited by examiner

PULL STRAP CONNECTOR AND ASSEMBLY THEREOF WITH IMPROVED LOCKING FEATURES

CROSS-REFERENCE TO RELATED APPLICATION

This patent application claims a priority of a Chinese Patent Application No. 202122460467.2, filed on Oct. 12, 2021 and titled "pull strap connector and pull strap connector assembly", the entire content of which is incorporated herein by reference.

TECHNICAL FIELD

The present disclosure relates to both a pull strap connector and a pull strap connector assembly, belonging to the technical field of connectors.

BACKGROUND

A pull strap connector assembly generally includes a pull strap connector and a mating connector engaged with the pull strap connector. The pull strap connector includes an insulating housing, a plurality of conductive terminals, a locking piece and a pulling strap. The conductive terminals are received in the insulating housing. The locking piece is located on one side of the insulating housing. The pulling strap is connected with the locking piece. The locking piece includes a hook and so the hook is located on one side of the insulating housing, too. The mating connector includes a slot and the slot is matched with the hook. However, the single-side locking design has weak retention force between the pull strap connector and the mating connector, and therefore, looseness easily occurs between the pull strap connector and the mating connector, which affects data transmission.

SUMMARY

An object of the present disclosure is to provide a pull strap connector with strong retention force to engage with a mating connector, and also provide a pull strap connector assembly comprising a pull strap connector and a mating connector engaged with the pull strap connector.

In order to achieve the above object, the present disclosure discloses a pull strap connector adapted for mating with a mating connector along a mating direction. The pull strap connector comprises an insulating housing, a plurality of conductive terminals, a movable element, an elastic member abutting against the movable element, and a pull strap connected with the movable element. The insulating housing comprises a main body and a tongue plate protruding from the main body along the mating direction. The main body comprises a first end wall and a second end wall opposite to the first end wall. Each conductive terminal comprises a mating portion exposed to the tongue plate. The movable element is at least partially installed on the main body. The movable element comprises at least one first locking protrusion protruding forward from the first end wall for engaging with a first locking hole of the mating connector. The movable element comprises at least one ejector rod extending from the first end wall back to the second end wall and rear end of the ejector rod is exposed out of the second end wall. The movable element further comprising at least one second locking protrusion on the rear end of the ejector rod. The second locking protrusion protrudes forward and spaced to the second end wall for engaging with a second locking hole of the mating connector. The pull strap is configured to drive the movable element to overcome the force of the elastic member so that the movable element moves along a front-back direction perpendicular to the mating direction.

In order to achieve the above object, the present disclosure also discloses a pull strap connector assembly comprising a pull strap connector and a mating connector. The pull strap connector comprises an insulating housing, a plurality of conductive terminals, a movable element, an elastic member abutting against the movable element, and a pull strap connected with the movable element. The insulating housing comprises a main body and a tongue plate protruding from the main body along the mating direction. The main body comprises a first end wall and a second end wall opposite to the first end wall. Each conductive terminal comprises a mating portion exposed to the tongue plate. The movable element is at least partially installed on the main body. The movable element comprises at least one first locking protrusion protruding forward from the first end wall. The movable element comprises at least one ejector rod extending backwardly from the first end wall to the second end wall. Rear end of the ejector rod is exposed out of the second end wall. The movable element further comprises at least one second locking protrusion formed at the rear end of the ejector rod. The second locking protrusion protrudes forwardly towards the second end wall. The mating connector comprises a mating housing, a plurality of mating terminals fixed on the mating housing, and a metal shell covering the mating housing. The mating housing defines a mating slot receiving the tongue plate of the pull strap connector. Each mating terminal comprises an elastic mating arm extending into the mating slot. The elastic mating arm contact with the mating portion of the pull strap connector. The metal shell comprises a first side wall and a second side wall opposite to the first side wall. The second side wall comprises an insertion plate portion. The metal shell further comprises a first locking hole defined on the first side wall and a second locking hole defined on the second side wall. The first locking protrusion is engaged in the first locking hole and the second locking protrusion is engaged in the second locking hole. The movable element moves along a front-back direction perpendicular to the mating direction, when a force is formed on the pull strap which drives the movable element to overcome the force of the elastic member, so that the first locking protrusion is disengaged from the first locking hole and the second locking protrusion is disengaged from the second locking hole.

Compared with the prior art, because the first locking protrusion is arranged at the front side of the insulative housing and the second locking protrusion is arranged at the back side of the insulative housing, the present disclosure can realize double-side locking purpose, thereby improving the retention force between the pull strap connector and the mating connector. The risk of loosening of the pull strap connector and the mating connector is reduced.

DETAILED DESCRIPTION

Figure 1:
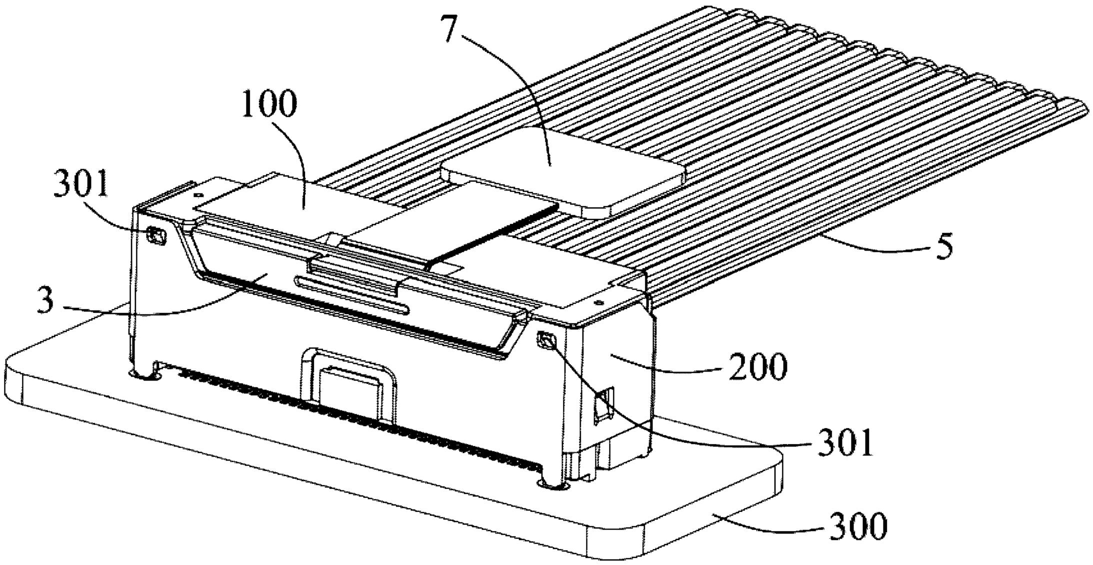
FIG. 1 is a perspective, assembled view of a pull strap connector assembly comprising a pull strap connector and a mating connector in accordance with an embodiment of the present disclosure.
Figure 2:
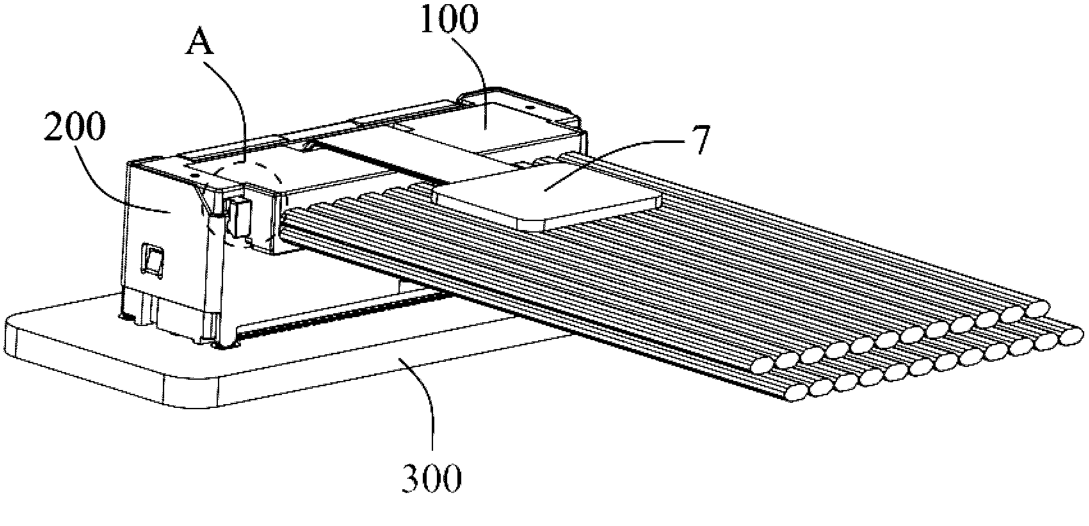
FIG. 2 is another perspective, assembled view of the pull strap connector assembly of FIG. 1.
Figure 3:
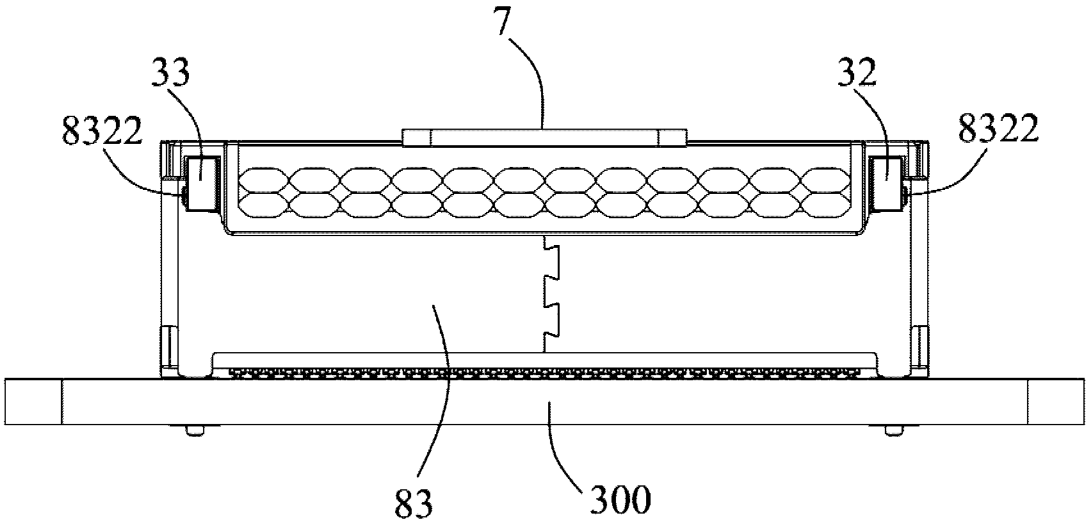
FIG. 3 is a back view of FIG. 1.

At least one exemplary embodiment will be described in detail here, examples of which are shown in drawings. When referring to the drawings below, unless otherwise indicated, same numerals in different drawings represent the same or similar elements. The examples described in the following exemplary embodiment do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Figure 4:
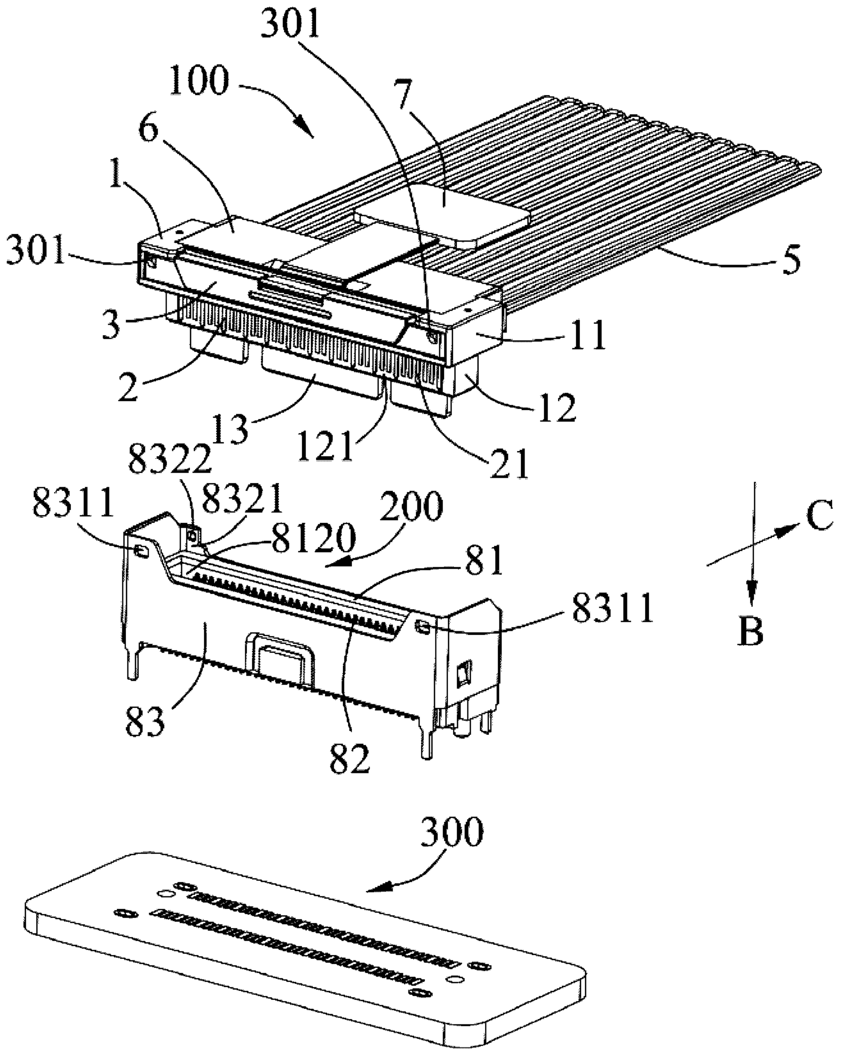
FIG. 4 is a perspective, exploded view of the pull strap connector assembly of FIG. 1.

Referring to FIGS. 1 to 15, the present disclosure discloses a pull strap connector assembly, which includes a pull strap connector 100 and a mating connector 200 matched with the pull strap connector 100. In the illustrated embodiment of the present disclosure, the pull strap connector 100 is a cable end connector and the mating connector 200 is a board end connector. Referring to FIG. 4, the pull strap connector 100 is matched with the mating connector 200 along an upper-lower mating direction (shown as B) to realize data transmission.

Referring to FIGS. 3 to 15, the pull strap connector 100 includes an insulating housing 1, a plurality of conductive terminals 2 fixed in the insulating housing 1, a movable element 3 installed on the insulating housing 1, an elastic member 4 abutting against the movable element 3, a cable 5 electrically connected to the conductive terminals 2, a cover plate 6 that is fastened on the insulating housing 1 and at least partially abuts the cable 5, and a pull strap 7 connected with the movable element 3. The pull strap 7 is configured to drive the movable element 3 to overcome the force of the elastic member 4, so that the movable element 3 moves along a front-back moving direction (shown as C) perpendicular to the mating direction in FIG. 4.

Figure 5:
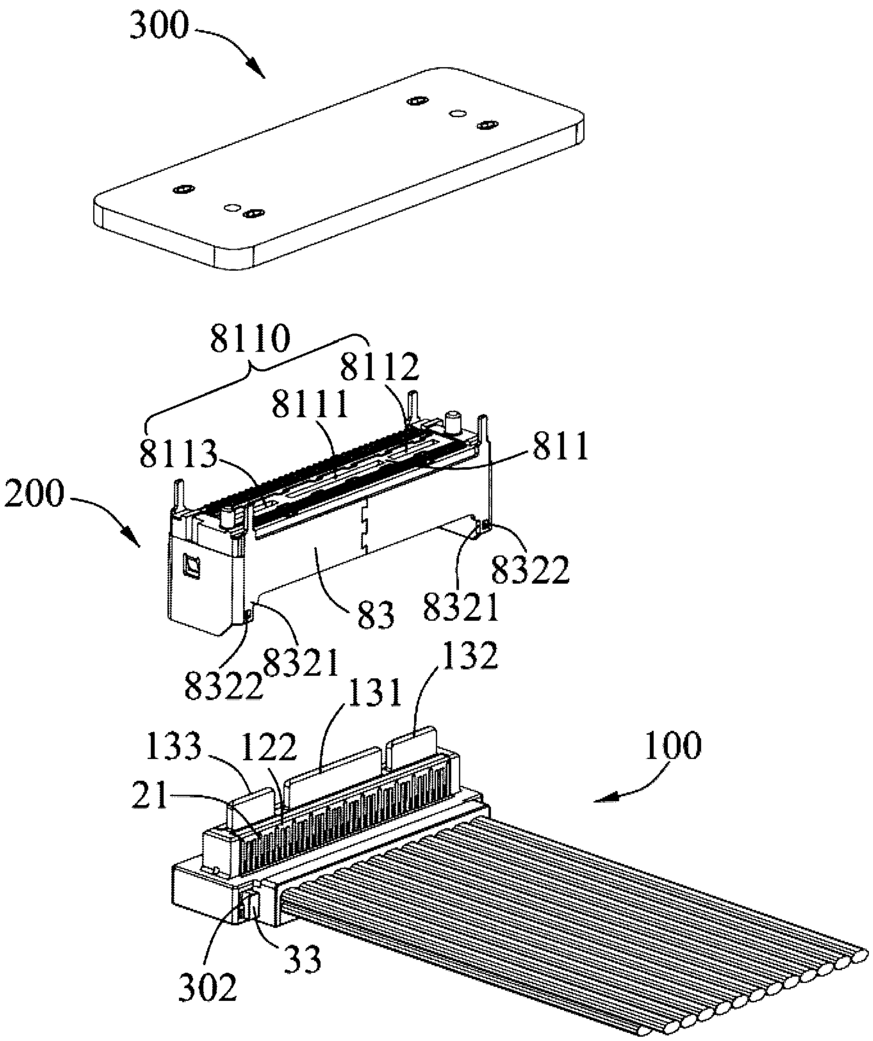
FIG. 5 is another perspective, exploded view of the pull strap connector assembly of FIG. 1.
Figure 6:
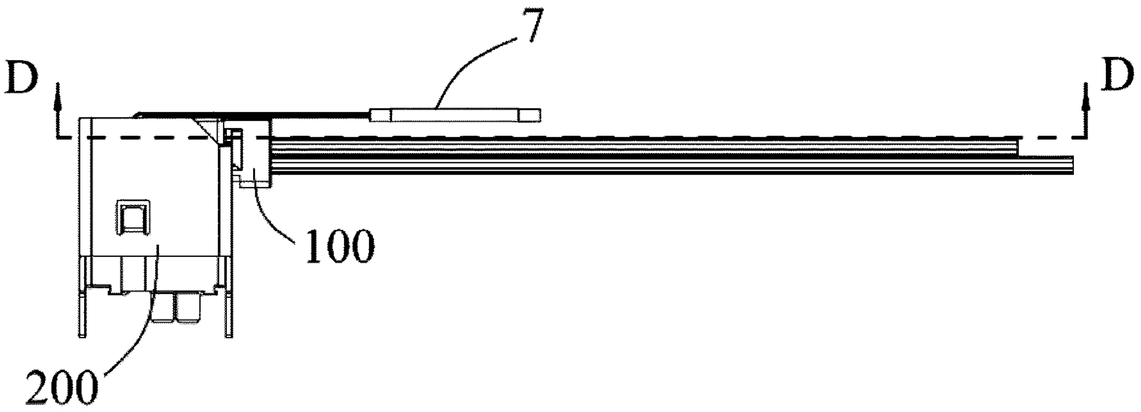
FIG. 6 is a right side view of a state where the mating connector excluding the circuit board is mated with the pull strap connector.

Referring to FIGS. 4 and 5, the insulating housing 1 includes a main body 11, a tongue plate 12 which protrudes downward from the main body 11 along the mating direction, and a positioning plate 13 which protrudes downward from the tongue plate 12 along the mating direction B. The dimension of the main body 11 in the front-back direction, the dimension of the tongue plate 12 in the front-back direction, and the dimension of the positioning plate 13 in the front-back direction are successively smaller, so that the insulating housing 1 is roughly stepped. The positioning plate 13 includes a first positioning piece 131 located in the middle, a second positioning piece 132 located on one side of the first positioning piece 131, and a third positioning piece 133 located on the other side of the first positioning piece 131. The second positioning piece 132 is spaced apart from the first positioning piece 131 and the third positioning piece 133 is spaced apart from the first positioning piece 131 too. The dimension of the first positioning piece 131 along a left-right direction is larger than the dimension of the second positioning piece 132 along the left-right direction, and the dimension of the first positioning piece 131 along the left-right direction is also larger than the dimension of the third positioning piece 133 along the left-right direction. It is known that, the left-right direction is perpendicular to both the upper-lower direction and front-back direction. The distance between the first positioning piece 131 and the second positioning piece 132 is different from the distance between the first positioning piece 131 and the third positioning piece 133. This arrangement prevents the pull strap connector 100 from being inserted into the mating connector 200 at a wrong angle, so that a certain foolproof effect can be achieved.

Figure 7:
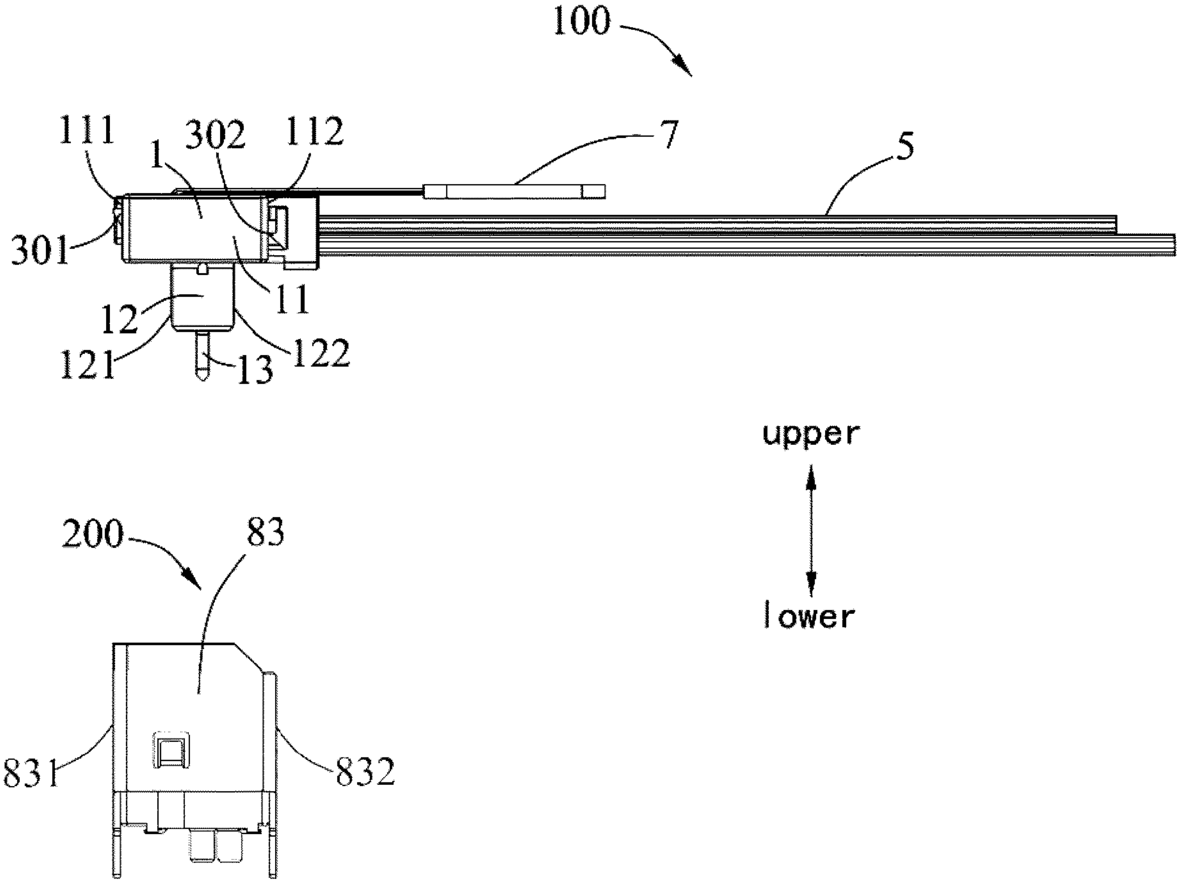
FIG. 7 is a right side view of a state where the mating connector excluding the circuit board is separated from the pull strap connector.
Figure 8:
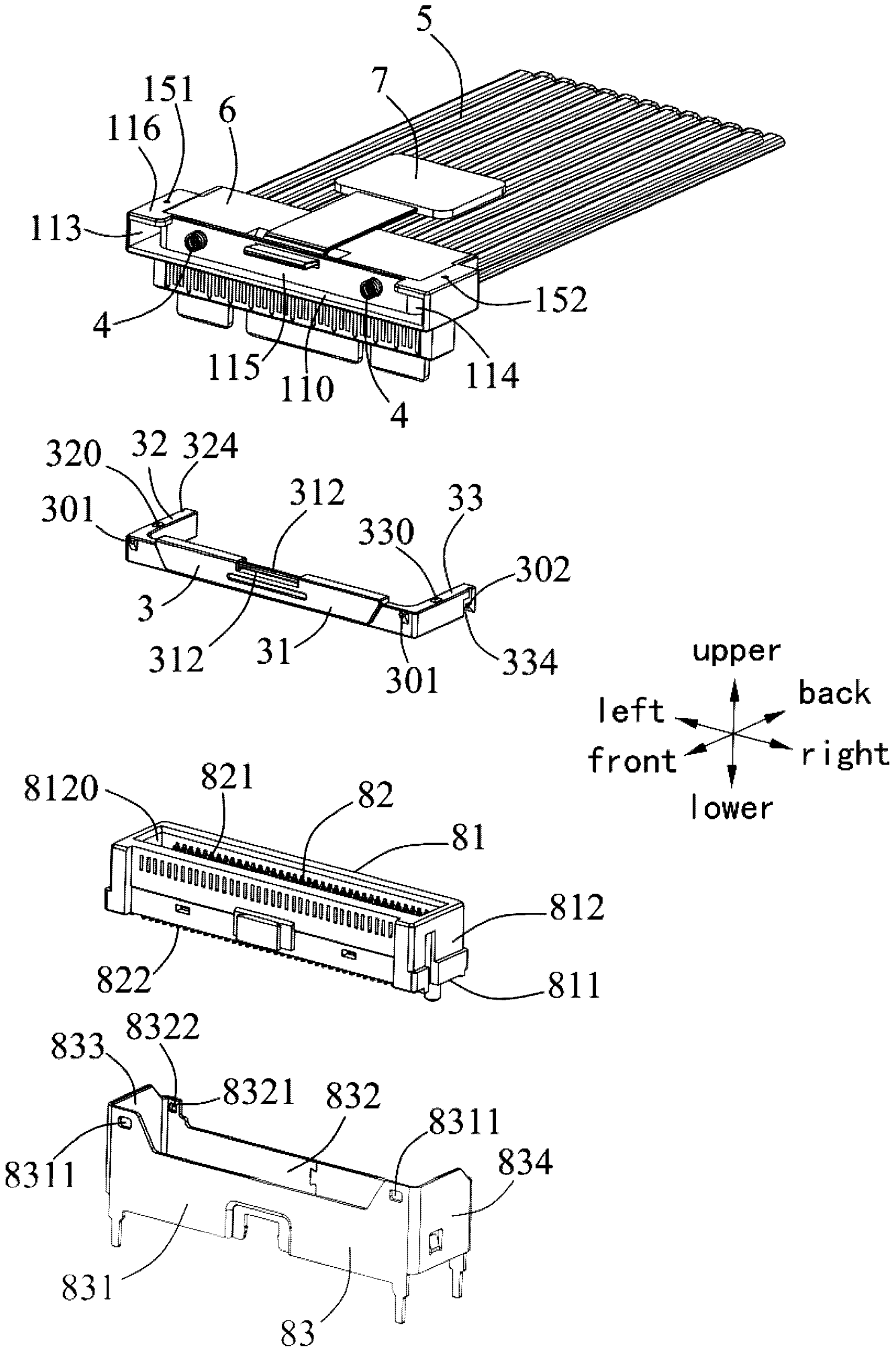
FIG. 8 is a perspective, further exploded view of the pull strap connector assembly of FIG. 1.

Referring to FIGS. 7 and 8, the main body 11 includes a first end wall 111 (e.g, a front end wall) and a second end wall 112 (e.g, a rear end wall) opposite to the first end wall 111. The main body 11 further includes a receiving space 110 penetrating the first end wall 111 forward, a first receiving groove 113 located on one side (e.g, the left side) of the receiving space 110, and a second receiving groove 114 located on the other side (e.g, the right side) of the receiving space 110. The receiving space 110 does not penetrate the second end wall 112 backward. The main body 11 includes an inner wall surface 115 exposed to the receiving space 110. The first receiving groove 113 and the second receiving groove 114 penetrate through the second end wall 112 along the moving direction C.

Figure 10:
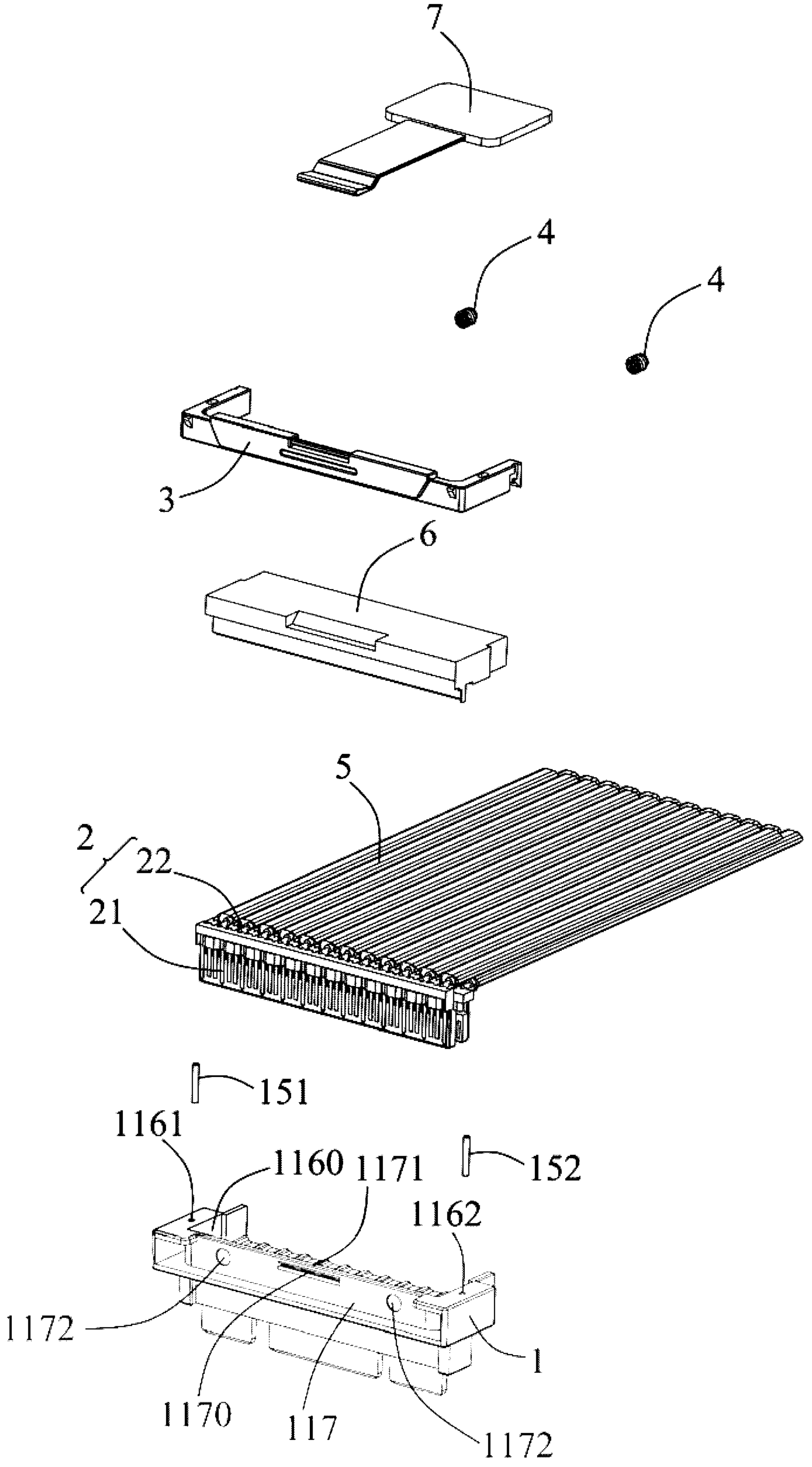
FIG. 10 is a perspective, further exploded view of the pull strap connector of FIG. 9.
Figure 11:
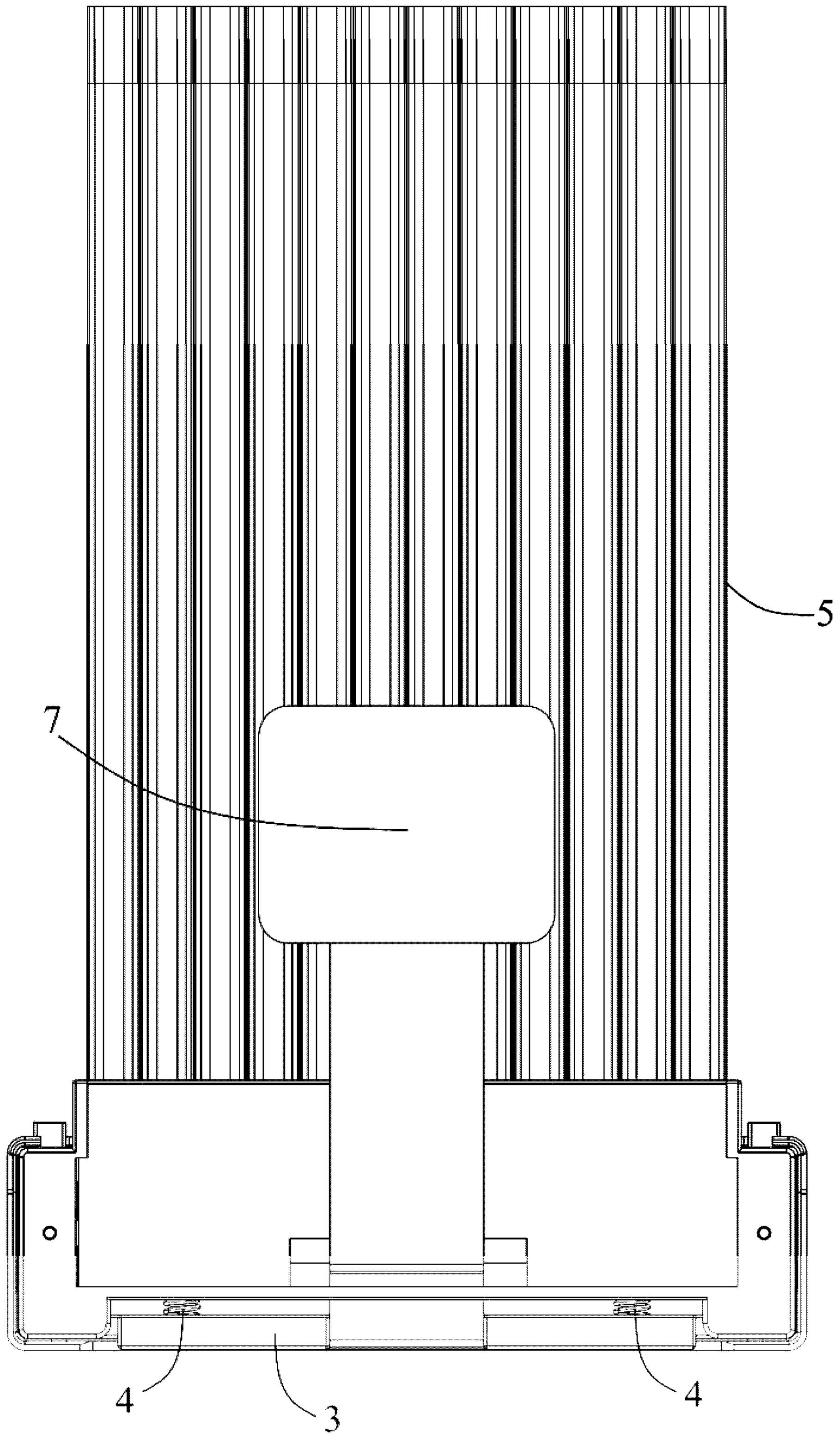
FIG. 11 is a top view of the pull strap connector of FIG. 4.

Referring to FIG. 10, The main body 11 includes a top surface 116, an opening 1160 extending upward through the top surface 116, a first mounting hole 1161 extending upward through the top surface 116 and located on one side of the opening 1160, and a second mounting hole 1162 extending upward through the top surface 116 and located on the other side of the opening 1160. The main body 11 further includes a fixing plate 117 located between the first end wall 111 and the second end wall 112. The fixing plate 117 is a vertical plate. The fixing plate 117 includes a pull strap groove 1170 passing through along the moving direction C, and a pull strap shaft 1171 located between the edge (e.g, the upper edge) of the fixing plate 117 and the pull strap groove 1170. The pull strap 7 extends from the connection between the pull strap 7 and the movable element 3 along the moving direction C, the pull strap 7 passes through the pull strap groove 1170, and the pull strap 7 wraps around the pull strap shaft 1171 and extends out of the main body 11. The fixing plate 117 further includes at least one receiving hole 1172. The number of the receiving holes 1172 is two. The receiving holes 1172 are exposed on the surface of the fixing plate 117 and face towards the movable element 3. One end of the elastic member 4 is disposed in the receiving hole 1172 and the other end of the elastic member 4 abuts against the movable member 3.

Referring to FIGS. 4 to 7, the tongue plate 12 includes a first surface 121 and a second surface 122 disposed opposite to each other.

Referring to FIG. 10, each conductive terminal 2 includes a mating portion 21 exposed to the tongue plate 12 and a connection portion 22 electrically connected to the cable 5. The mating portion 21 is in the shape of a flat plate and is exposed to the first surface 121 and the second surface 122 respectively. In a first embodiment of the present disclosure, the conductive terminals 2 are insert-molded on the insulating housing 1. Of course, in a second embodiment, the conductive terminals 2 can also be directly mounted on the insulating housing 1; or in a third embodiment, the conductive terminals 2 and the insulating block are first combined into a terminal module, and then the terminal module are mounted on the insulating housing 1. The fixing method of the conductive terminals 2 and the insulating housing 1 is well known to those persons skilled in the art, and will not be described in detail in the present disclosure.

Referring to FIGS. 1 to 4, the cable 5 extends beyond the main body 11 along the moving direction C.

Figure 12:
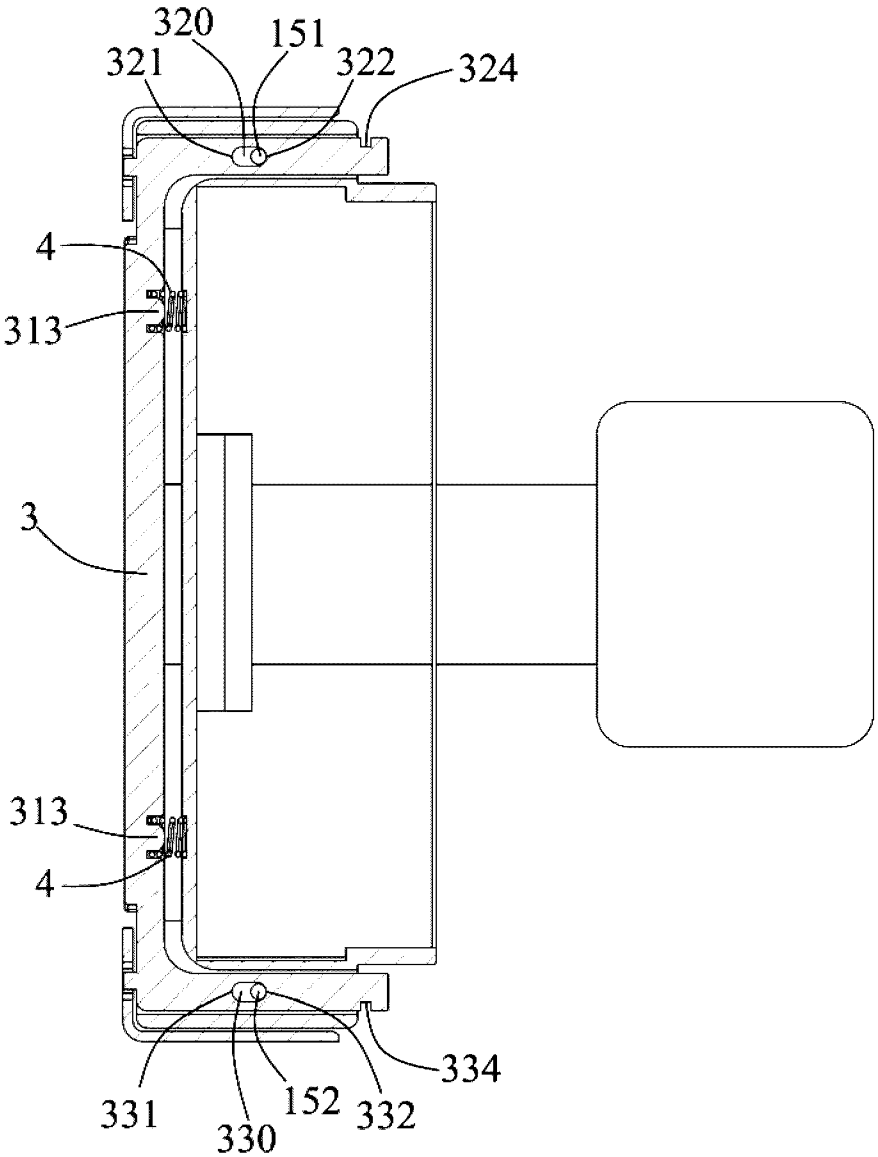
FIG. 12 is a schematic cross-sectional view taken along the line D-D in FIG. 6.

Referring to FIGS. 8 and 12, the movable element 3 is at least partially installed in the main body 11. The movable element 3 includes a base 31, a first ejector rod 32 extending backward from one side of the base 31, and a second ejector rod 33 extending backward from the other side of the base 31. The base 31 is accommodated in the receiving space 110. Most of the first ejector rod 32 is accommodated in the first receiving groove 113 and just the rear end of the first ejector rod 32 extends out of the first receiving groove 113. Most of the second ejector rod 33 is accommodated in the second receiving groove 114 and just the rear end of the second ejector rod 33 extends out of the second receiving groove 114. Both the first ejector rod 32 and the second ejector rod 33 can be referred to as ejector rods, such ejector rods extend from the first end wall 111 to the second end wall 112 with the rear ends thereof protrude from the second end wall 112.

Referring to FIGS. 7 and 8, the base 31 includes two first locking protrusions 301 respectively located on two sides (e.g, left and right) of the base 31, so as to improve the mating retention force. The first locking protrusions 301 are integrally formed with the main body 11. Of course, in another embodiment, the first locking protrusions 301 can also be manufactured separately from the main body 11, and then assembled and fixed together. In this case, the first locking protrusions 301 can be made of a material different from that of the main body 11, for example, a wear-resistant material with better structural strength. The base 31 further includes a pull strap connecting portion 312, and the pull strap 7 is connected to the pull strap connecting portion 312. The movable element 3 includes a transverse slot 311 extending through the base 31 along the moving direction C. The pull strap connecting portion 312 is located above the transverse slot 311. The pull strap connecting portion 312 is similar to a shaft portion, and is located between the transverse slot 311 and the edge (e.g, the upper edge) of the base 31. One end of the pull strap 7 passes through the transverse slot 311 and is sleeved around the pull strap connecting portion 312.

In alternatively embodiment of the present disclosure, the first locking protrusion 301 can be only one and the only one first locking protrusion 301 protrudes forward from a middle part of the first end wall 111, which has same distances to both the left-front side of the base 31 and the right-front side of the base 31.

Referring to FIGS. 9 to 12, the elastic member 4 is a compression spring installed between the base 31 and the inner wall surface 115 of the main body 11. The number of the compression springs is two, and the two compression springs are arranged side by side to improve the stability of the moving part 3 when moving. In addition, in order to better positioning the compression spring, the base 31 is further provided with a positioning post 313 which is at least partially inserted into the compression spring.

Referring to FIGS. 7 and 8, the movable element 3 further includes a second locking protrusion 302 protruding backward from the second end wall 112. The number of the second locking protrusions 302 is two. One of the second locking protrusions 302 is located at the rear end of the first ejector rod 32 away from the base 31. The one of the second locking protrusions 302 is located outside the first receiving groove 113. The one of the second locking protrusions 302 protrudes toward the first receiving groove 113. The other one of the second locking protrusions 302 is located at the rear end of the second ejector rod 33 away from the base 31. The other one of the second locking protrusions 302 is located outside the second receiving groove 114. The other one of the second locking protrusions 302 protrudes toward the second receiving groove 114. The two second locking protrusions 302 are arranged in such a manner to improve an engagement force. The second locking protrusion 302 is integrally formed with the corresponding ejector rod to save cost. Of course, in another embodiment, the second locking protrusion 302 can also be produced separately from the corresponding ejector rod, and then assembled and fixed together. In this case, the second locking protrusion 302 can be made of a different material from that of the ejector rod. The first locking protrusions 301 and the second locking protrusions 302 are used for engaging with the locking holes of the mating connector 200 to improve the engagement force.

The two first locking protrusions 301 and the two second locking protrusions 302 are both arranged on the left side and the right side of the pull strap connector, the present disclosure can realize double-side locking purpose, thereby improving the retention force between the pull strap connector and the mating connector. In an alternative embodiment, the only one first locking protrusion 301 is arranged on the middle part of the pull strap connector and the two second locking protrusions 302 are arranged on the left side and the right side of the pull strap connector, can also realize double-side locking purpose, thereby improving the retention force between the pull strap connector and the mating connector.

Figure 9:
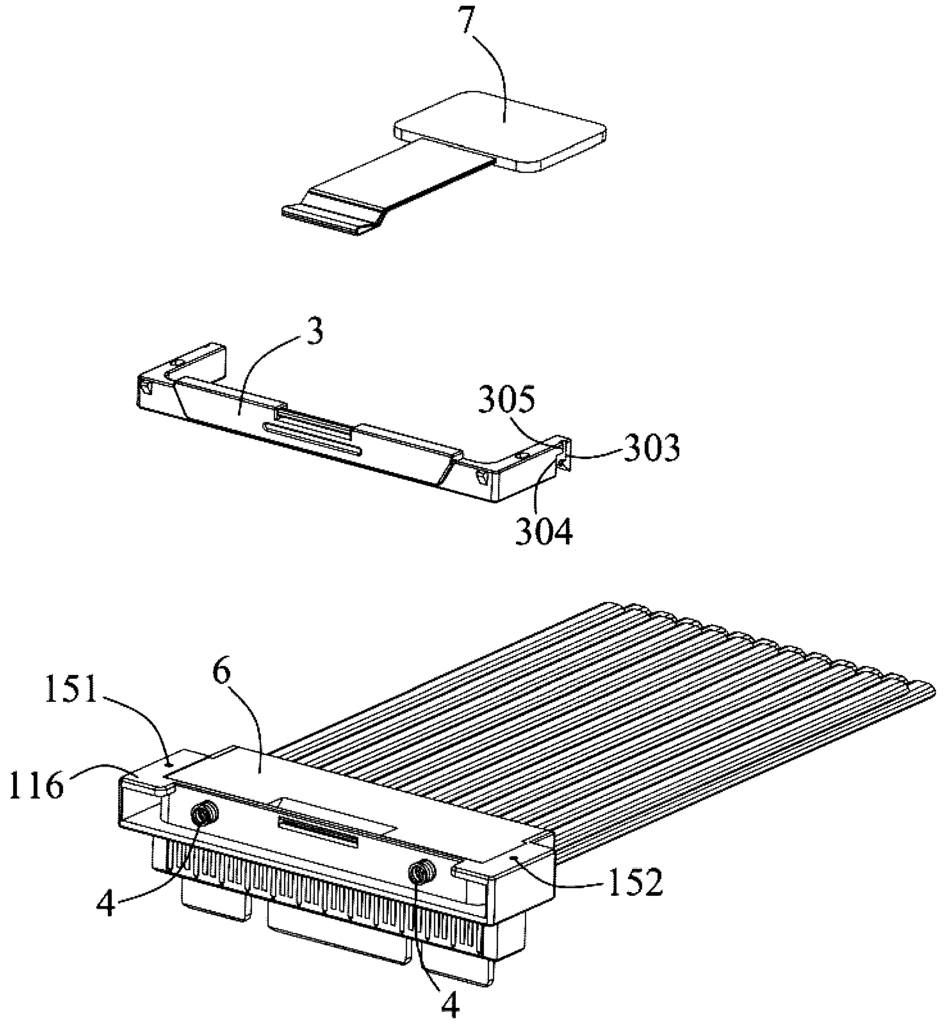
FIG. 9 is a perspective, further exploded view of the pull strap connector of FIG. 8.

Referring to FIGS. 8, 9 and 12, the first ejector rod 32 includes a first limiting groove 320 in the middle, a first limiting surface 321 located at one end of the first limiting groove 320 along the moving direction C, and a second limiting surface 322 is located at the other end of the first limiting groove 320 along the moving direction C. Compared with the second limiting surface 322, the first limiting surface 321 is closer to the first end wall 111. Similarly, the second ejector rod 33 includes a second limiting groove 330 in the middle, a third limiting surface 331 located at one end of the second limiting groove 330 along the moving direction C, and a fourth limiting surface 332 is located at the other end of the second limiting groove 330 along the moving direction C. Compared with the fourth limiting surface 332, the third limiting surface 331 is closer to the first end wall 111.

Referring to FIGS. 8, 9 and 12, the first ejector rod 32 further includes a first concave groove 324 located at the distal end (rear end), and the second ejector rod 33 further includes a second concave groove 334 located at the distal end (rear end). Both the first concave groove 324 and the second concave groove 334 are referred to as groove portions. Each groove portion has a first blocking wall 303 (e.g, a rear blocking wall), a second blocking wall 304 (e.g, a front lower blocking wall) and a third blocking wall 305 (e.g, a front upper blocking wall). The second blocking wall 304 is located below the first blocking wall 303 to face the first blocking wall 303. The third blocking wall 305 is located above the first blocking wall 303 to face the first blocking wall 303. A large-diameter portion (not numbered) is formed between the first blocking wall 303 and the second blocking wall 304, and a small-diameter portion (not numbered) is formed between the first blocking wall 303 and the third blocking wall 305. The dimension of the small-diameter portion in the front-back direction is smaller than the dimension of the large-diameter portion in the front-back direction.

It should be emphasized that: in this embodiment, the groove portion penetrates vertically and includes the small-diameter portion and the large-diameter portion, and the small-diameter portion exists according to the manufacturing process of the groove portion; in another embodiment, the groove portion does not include the small-diameter portion and only includes the large-diameter portion, so that when the insertion plate portion 8321 is accommodated in the groove portion which only includes the large-diameter portion, the groove portion can move together with the movable member 3 in the front-back direction, and the second locking protrusion 302 can be inserted into the second locking hole 8322 of the insertion plate portion 8321 for engagement.

Referring to FIGS. 4, 7 and 8, the second locking protrusion 302 protrudes from the bottom of the first blocking wall 303 toward the second blocking wall 304, and the second locking protrusion 302 is spaced from the second blocking wall 304 by a distance. Because the first locking protrusion 301 also protrudes from the rear to the front, the first locking protrusion 301 and the second locking protrusion 302 in the present disclosure have the same forward protruding direction. The forward protruding direction is opposite to the moving direction C.

Referring to FIGS. 8 to 12, the pull strap connector 100 includes a first pin 151 fixed in the first mounting hole 1161 and a second pin 152 fixed in the second mounting hole 1162. The first pin 151 is inserted into the first limiting groove 320 and the second pin 152 is inserted into the second limiting groove 330. The dimension of the first limiting groove 320 is larger than the dimension of the first pin 151 along the moving direction C. The dimension of the second limiting groove 330 is larger than the dimension of the second pin 152 along the moving direction C. The first limiting surface 321 is used for engaging with the first pin 151, and the third limiting surface 331 is used for engaging with the second pin 152, so as to prevent the movable element 3 from moving excessively along the moving direction C. The second limiting surface 322 is used for engaging with the first pin 151, and the fourth limiting surface 332 is used for engaging with the second pin 152, so as to prevent the movable element 3 from returning excessively along the opposite direction of the moving direction C.

Referring to FIGS. 4 and 10, the cover plate 6 is accommodated and fixed in the opening 1160 of the main body 11, and the pull strap 7 extends out of the cover plate 6. The cover plate 6 presses the connection between the cable 5 and the conductive terminals 2 (for example, the welding parts of the cable 5 and the conductive terminals 2), so as to play a protective role.

Referring to FIGS. 2-8 and 13, the mating connector 200 includes a mating housing 81, a plurality of mating terminals 82 fixed on the mating housing 81, and a metal shell 83 covering the mating housing 81. The mating housing 81 includes a bottom wall 811 and several sidewalls 812 perpendicular to the bottom wall 811. The bottom wall 811 defines a positioning groove 8110 for accommodating the positioning plate 13. The positioning groove 8110 includes a first positioning groove 8111 for accommodating the first positioning piece 131, a second positioning groove 8112 for accommodating the second positioning piece 132, and a third positioning groove 8113 for accommodating the third positioning piece 133. The first positioning groove 8111, the second positioning groove 8112 and the third positioning groove 8113 all penetrate through the bottom wall 811.

Figure 13:
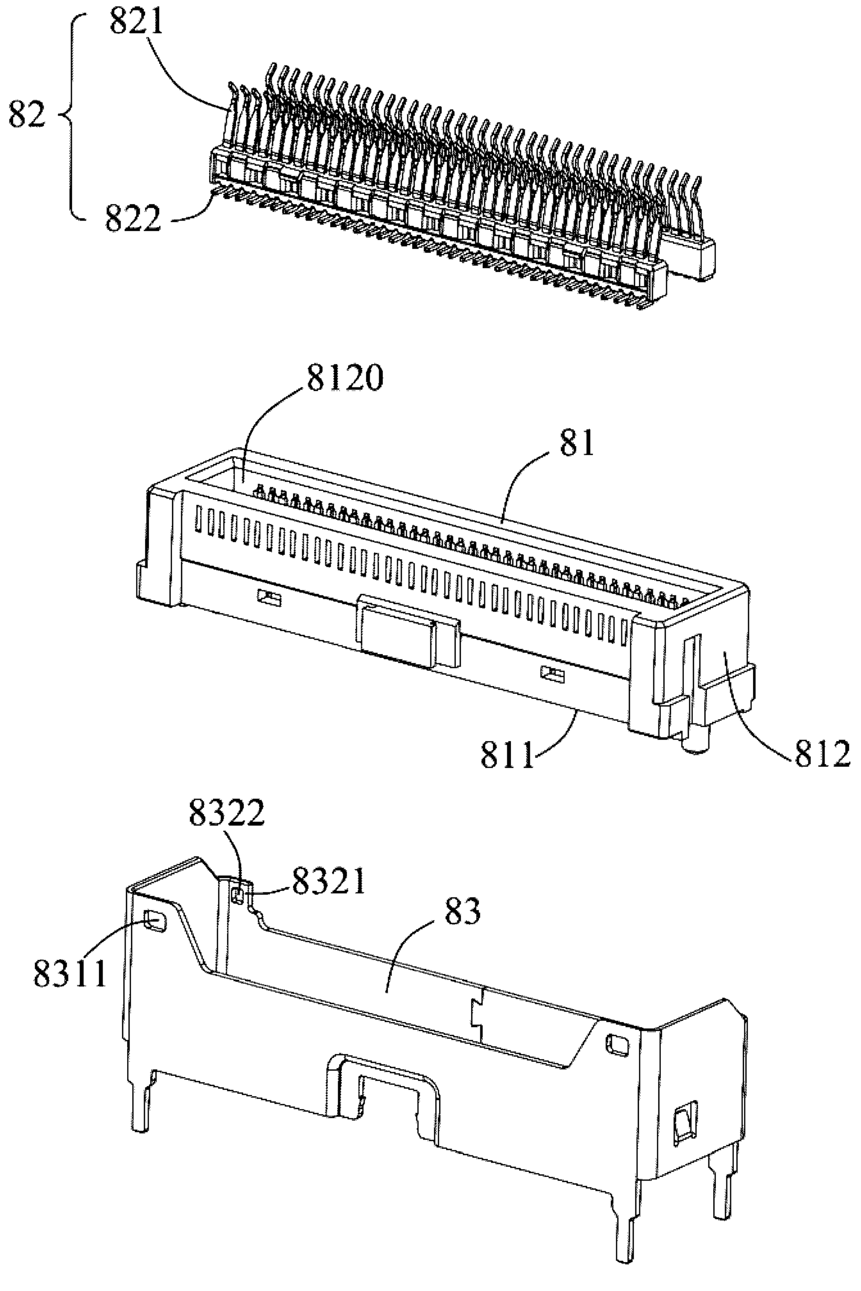
FIG. 13 is a perspective, further exploded view of the mating connector of FIG. 8.
Figure 14:
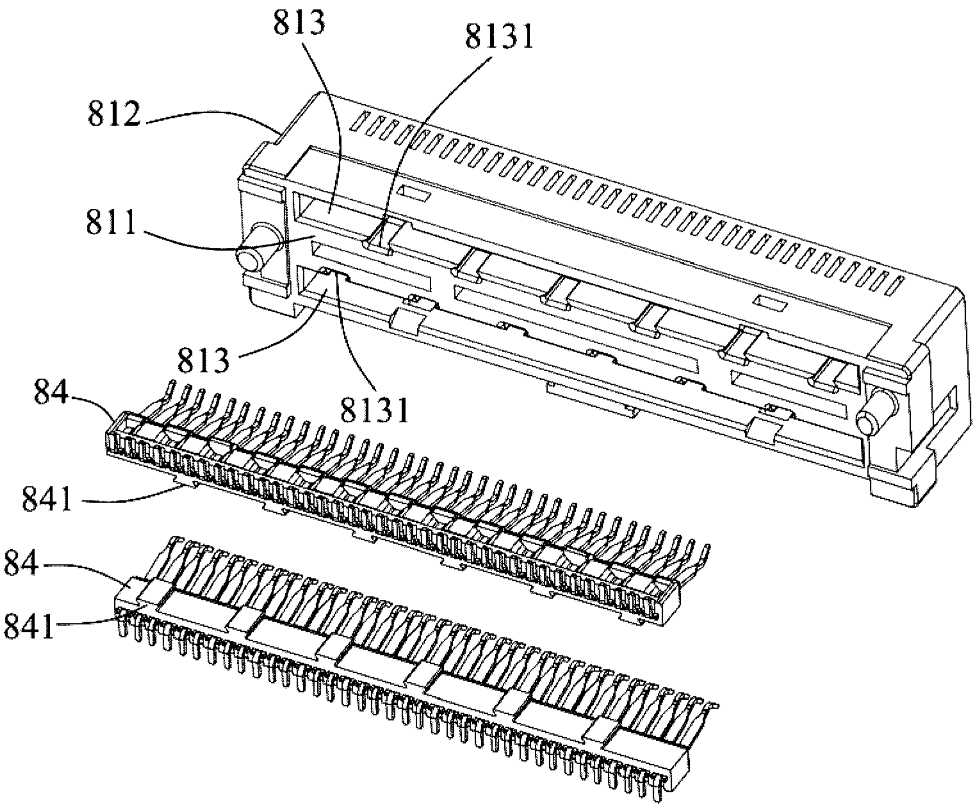
FIG. 14 is a perspective, exploded view of the mating housing and the mating terminal in FIG. 13.
Figure 15:
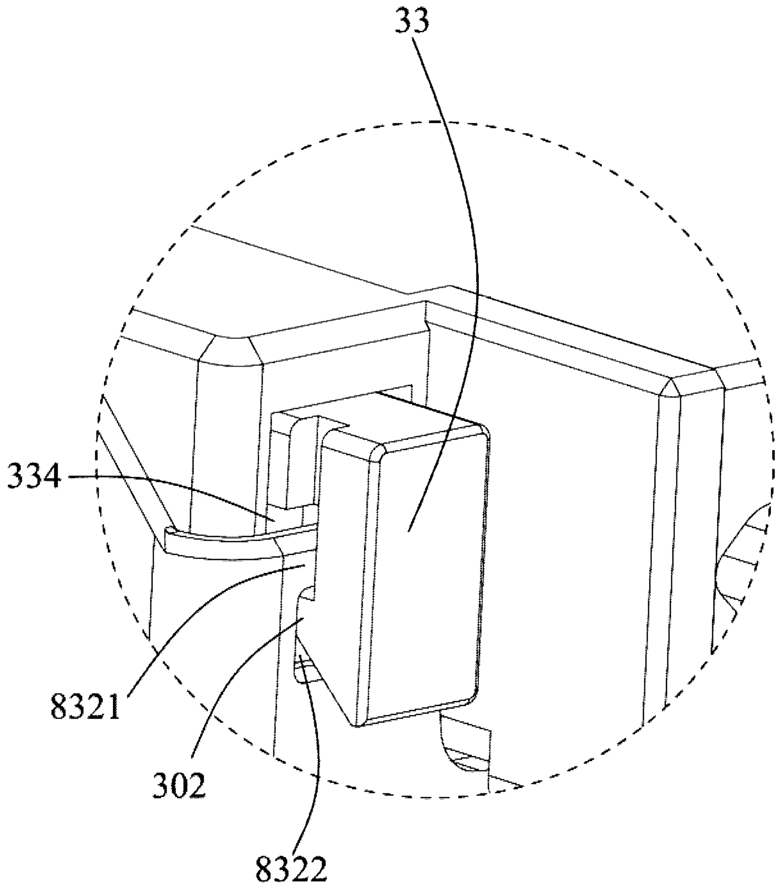
FIG. 15 is a schematic cross-sectional view taken along the line E-E in FIG. 2.

Referring to FIGS. 13 and 14, the mating connector 200 includes a terminal fixing block 84 and the mating terminals 82 are fixed on the terminal fixing block 84. The mating housing 81 includes a terminal accommodating groove 813 and the terminal fixing block 84 is fixed in the terminal accommodating groove 813. The terminal fixing block 84 includes a first engaging portion 841. One side of the terminal accommodating groove 813 includes a second engaging portion 8131. The first engaging portion 841 and the second engaging portion 8131 are engaged with each other, so that the terminal fixing block 84 is fixed in the terminal accommodating groove 813. The first engaging portion 841 is a dovetail-shaped bump and the second engaging portion 8131 is a dovetail-shaped groove matching the dovetail-shaped bump.

The number of the terminal fixing blocks 84 is two and the two terminal fixing blocks 84 are symmetrical and spaced apart from each other. The mating terminals 82 are arranged in two symmetrical rows and the two rows of mating terminals 82 are respectively fixed on the two terminal fixing blocks 84. There are two terminal accommodating grooves 813. The two terminal accommodating grooves 813 are symmetrical and spaced apart from each other. The two terminal accommodating grooves 813 are respectively formed between the bottom wall 811 and the two opposite sidewalls 812. The two terminal fixing blocks 84 are fixed in the two terminal accommodating grooves 813. Each of the terminal fixing blocks 84 includes a plurality of first engaging portions 841. One side of each of the terminal accommodating grooves 813 includes a plurality of second engaging portions 8131 corresponding to the plurality of first engaging portions 841 respectively. Each of the first engaging portions 841 and the corresponding second engaging portions 8131 are engaged with each other, so that each terminal fixing block 84 is fixed in the corresponding terminal accommodating groove 813. The first engaging portions 841 are respectively disposed on the sides of the two terminal fixing blocks 84 facing each other. The second engaging portions 8131 are respectively disposed on opposite sides of the bottom wall 811 facing the two terminal accommodating grooves 813.

Referring to FIGS. 8 and 13, the sidewalls 812 define a mating slot 8120 for receiving the tongue plate 12. The mating terminals 82 are arranged in two rows. The mating terminals 82 include elastic mating arms 821 and mounting tails 822. The mounting tails 822 are used for mounting on a circuit board 300. The elastic mating arms 821 extend into the mating slot 8120 for contacting with the mating portion 21.

Referring to FIGS. 4, 5 and 8, the metal shell 83 includes a first side wall 831, a second side wall 832, a first connecting wall 833, and a second connecting wall 834. The second side wall 832 is disposed opposite to the first side wall 831. The first connecting wall 833 connects one side of the first side wall 831 and one side of the second side wall 832. The second connecting wall 834 connects the other side of the first side wall 831 and the other side of the second side wall 832. The first side wall 831 includes a first locking hole 8311 engaged with the first locking protrusion 301. The second side wall 832 includes an insertion plate portion 8321 at a corner near the first connecting wall 833 and a corner near the second connecting wall 834. That is to say, each of the left and right sides of the second side wall 832 includes an insertion plate portion 8321. The insertion plate portion 8321 includes a second locking hole 8322 matched with the second locking protrusion 302. The insertion plate portion 8321 is integrally formed on the second side wall 832. The insertion plate portion 8321 and the first connecting wall 833 are integrally formed and the insertion plate portion 8321 and the second connecting wall 834 are also integrally formed without any gap. Therefore, the insertion plate portion 8321 has no elasticity.

When the pull strap connector 100 is inserted into the mating connector 200 to be locked, the positioning plate 13 is correspondingly accommodated in the positioning groove 8110, the tongue plate 12 is correspondingly accommodated in the mating slot 8120, and the mating portions 21 of the conductive terminals 2 correspondingly contact with the elastic mating arms 821 of the butting terminals 82. With the insertion of the pull strap connector 100, the inclined surface of the first locking protrusion 301 abuts against the first side wall 831, the inclined surface of the second locking protrusion 302 abuts against the second side wall 832. The movable element 3 overcomes the force of the elastic part 4 and shrinks inward by a certain distance along the moving direction C. When the first locking protrusion 301 moves downward to the first locking hole 8311 and the second locking protrusion 302 moves downward to the second locking hole 8322, the elastic force of the elastic member 4 is released, so that the movable element 3 moves back in the direction opposite to the moving direction C. The first locking protrusion 301 protrudes forward into the first locking hole 8311 and the second locking protrusion 302 protrudes forward and protrudes into the second locking hole 8322, in order to realize the locking of the pull strap connector 100 and the mating connector 200.

When the pull strap connector 100 and the mating connector 200 need to be unlocked, the operator applies an external force to pull the pull strap 7, and the pull strap 7 generates a component force along the moving direction C, and the component force in this direction overcomes the force of the elastic member 4, so that the movable element 3 moves along the moving direction C. The first ejector rod 32 and the second ejector rod 33 move away from the insertion plate portion 8321 backwards, so that the second locking protrusion 302 and the second locking hole 8322 are disengaged from each other. The first locking protrusion 301 and the first locking hole 8311 are also separated from each other. That is to say, the pull strap connector 100 and the mating connector 200 are unlocked on both sides. The pull strap connector 100 can be pulled out of the mating connector 200 by applying other forces or by an upward component force exerted on the pull strap 7.

The insertion plate portion 8321 is accommodated in the large-diameter portion of the groove portion in both the locked state of the pull strap connector 100 and the mating connector 200 and the unlocked state of the pull strap connector 100 and the mating connector 200. When the movable member 3 drives the second locking protrusion 302 to move and the second locking protrusion 302 cooperates with the second locking hole 8322, the insertion plate portion 8321 is in contact with the first blocking wall 303, and the insertion plate portion 8321 is separated from the second blocking wall 304. When the movable member 3 drives the second locking protrusion 302 to move and the second locking protrusion 302 and the second locking hole 8322 are disengaged from each other, the insertion plate portion 8321 is in contact with the second blocking wall 304, and the insertion plate portion 8321 is separated from the first blocking wall 303.

Compared with the prior art, the present disclosure can realize double-side locking purpose by arranging the first locking protrusions 301 at the front side of the insulative housing 1 and the second locking protrusions 302 at the back side of the insulative housing 1, thereby improving the retention force between the pull strap connector 100 and the mating connector 200. In a preferred embodiment, a number of the first locking protrusions 301 and a number of the second locking protrusions 302 are both two: both one of the first locking protrusions 301 and one of the second locking protrusions 302 are arranged at a left part of the insulative housing 1; both the other one of the first locking protrusions 301 and the other one of the second locking protrusions 302 are arranged at a right part of the insulative housing 1. The risk of loosening of the pull strap connector 100 and the mating connector 200 is reduced.

The above embodiments are only used to illustrate the present disclosure and not to limit the technical solutions described in the present disclosure. The understanding of this specification should be based on those skilled in the art. Descriptions of directions, such as "front", "back", "left", "right", "upper" and "lower", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A pull strap connector, comprising:

an insulating housing comprising a main body and a tongue plate protruding from the main body along a mating direction, the main body comprising a first end wall and a second end wall, the first end wall and the second end wall being oppositely-positioned;

a plurality of conductive terminals, each conductive terminal comprising a mating portion exposed to the tongue plate;

a movable component at least partially installed on the main body, the movable component comprising a base, a first locking protrusion protruding forward from the base, an ejector rod extending backward from the base, and a second locking protrusion protruding forward from a rear end of the ejector rod, the first locking protrusion being exposed out of the first end wall, the rear end of the ejector rod being exposed out of the second end wall, the first locking protrusion and the second locking protrusion being adapted for engaging with locking holes of a mating connector;

an elastic member abutting against the movable component; and a pull strap connected with the movable component; wherein, the pull strap is configured to drive the movable component to overcome the force of the elastic member, so that the movable component moves along a front-back direction.

2. The pull strap connector according to claim 1, wherein the ejector rod comprises a groove portion, the groove portion has a first blocking wall and a second blocking wall which oppositely faces the first blocking wall, the second locking protrusion protrudes from the first blocking wall toward the second blocking wall, and the second locking protrusion is spaced from the second blocking wall by a distance.

3. The pull strap connector according to claim 1, wherein the main body comprises a fixing plate located between the first end wall and the second end wall, the fixing plate comprises a pull strap groove and a pull strap shaft located between an edge of the fixing plate and the pull strap groove; and wherein the pull strap extends from a connection between the pull strap and the movable component along the front-back direction to pass through the pull strap groove, and the pull strap wrap around the pull strap shaft, and extends out of the main body.

4. The pull strap connector according to claim 3, wherein the fixing plate comprises a receiving hole, the receiving hole is on a surface of the fixing plate which faces towards the movable component, an end of the elastic member is disposed in the receiving hole, and an another end of the elastic member abuts against the movable member.

5. The pull strap connector according to claim 1, further comprising a pin fixed to the insulating housing, wherein the ejector rod comprises a limiting groove, the pin is fixed to the insulating housing and in the limiting groove, and the dimension of the limiting groove is greater than the dimension of the corresponding pin along the front-back direction.

6. The pull strap connector according to claim 5, wherein the ejector rod comprises a first limiting surface located at an end of the first limiting groove and a second limiting surface located at an another end of the first limiting groove along the front-back direction, the first limiting surface is closer to the first end wall when the first limiting surface is compared with the second limiting surface, the first limiting surface is adapted for engaging with the pin so as to prevent the movable component from moving excessively along the front-back direction, the second limiting surface is adapted for engaging with the pin so as to prevent the movable component from returning excessively along the opposite direction of the front-back direction.

7. The pull strap connector according to claim 1, wherein the main body defines a receiving space extending through the first end wall, a first receiving groove located on a side of the receiving space, and a second receiving groove located on an another side of the receiving space, the first receiving groove and the second receiving groove extend through the second end wall along the front-back direction; and wherein the base is received in the receiving space, the ejector rod comprise a first ejector rod extending from a side of the base and a second ejector rod extending from an another side of the base, the first ejector rod is at least partially accommodated in the first receiving groove except a rear end of the first ejector rod extends out of the first receiving groove, the second ejector rod is at least partially accommodated in the second receiving groove except a rear end of the second ejector rod extends out of the second receiving groove.

8. The pull strap connector according to claim 7, wherein the number of the first locking protrusion is two and the two first locking protrusions are respectively located on two sides of the base, the number of the second locking protrusion is two, wherein one of the second locking protrusions is located at the rear end of the first ejector rod away from the base and out of the first receiving groove and protrudes toward the first receiving groove, and wherein the other one of the second locking protrusions is located at the rear end of the second ejector rod away from the base and out of the second receiving groove and protrudes toward the second receiving groove.

9. The pull strap connector according to claim 7, wherein the first locking protrusion is located on a middle-front side of the base which has same distances to both the left-front side of the base and the right-front side of the base, the number of the second locking protrusion is two, wherein one of the second locking protrusions is located at the rear end of the first ejector rod away from the left-back side of the base and protrudes toward the first receiving groove, and wherein the other one of the second locking protrusions is located at the rear end of the second ejector rod away from the right-back side of the base and protrudes toward the second receiving groove.

10. The pull strap connector according to claim 7, further comprising a cover plate fastened on the insulating housing, wherein the base comprises a pull strap connecting portion and the pull strap is connected to the pull strap connecting portion, and wherein the pull strap extends out of the cover plate.

11. The pull strap connector according to claim 10, further comprising a cable electrically connected to the conductive terminals and extending beyond the main body along the front-back direction, wherein the cover plate presses against the connection of the cable and the conductive terminals.

12. The pull strap connector according to claim 1, wherein the first end wall and the second end wall are oppositely-positioned along the front-back direction perpendicular to the mating direction, the first locking protrusion protrudes forward from the first end wall, the second locking protrusion is on the rear end of the ejector rod, is spaced to the second end wall, and protrudes forward from the ejector rod.

13. A pull strap connector assembly, comprising:

a pull strap connector, comprising:

an insulating housing comprising a main body and a tongue plate protruding from the main body, the main body comprising a first end wall and a second end wall opposite to the first end wall;

a plurality of conductive terminals, each conductive terminal comprising a mating portion exposed to the tongue plate;

a movable component at least partially installed on the main body, the movable component comprising a base, a first locking protrusion protruding forward from the base, an ejector rod extending backward from the base, and a second locking protrusion protruding forward from a rear end of the ejector rod, the first locking protrusion being exposed out of the first end wall, the rear end of the ejector rod being exposed out of the second end wall;

an elastic member abutting against the movable component; and a pull strap connected with the movable component; and a mating connector engaged with the pull strap connector along a mating direction, comprising:

a mating housing, defining a mating slot receiving the tongue plate of the pull strap connector;

a plurality of mating terminals fixed on the mating housing, each mating terminal comprising an elastic mating arm extending into the mating slot, the elastic mating arm contacting with the mating portion of the pull strap connector; and a metal shell covering the mating housing, the metal shell comprising a first side wall and a second side wall opposite to the first side wall, the second side wall comprising an insertion plate portion, the metal shell further comprising a first locking hole defined on the first side wall and a second locking hole defined on the insertion plate portion, the first locking protrusion being engaged in the first locking hole, the second locking protrusion being engaged in the second locking hole, the ejector rod being configured to extend beyond the insertion plate portion along a front-back direction perpendicular to the mating direction, wherein, while the movable component moves along the front-back direction, the first locking protrusion is disengaged from the first locking hole and the second locking protrusion is disengaged from the second locking hole.

14. The pull strap connector assembly according to claim 13, wherein the ejector rod comprises a groove portion, the groove portion has a first blocking wall and a second blocking wall which oppositely faces the first blocking wall, the second locking protrusion protrudes from the first blocking wall toward the second blocking wall, and the insertion plate portion is accommodated in the groove portion.

15. The pull strap connector assembly according to claim 14, wherein the insertion plate portion is in contact with the first blocking wall and the insertion plate portion is separated from the second blocking wall when the second locking protrusion cooperates with the second locking hole; and wherein the insertion plate portion is in contact with the second blocking wall and the insertion plate portion is separated from the first blocking wall when the second locking protrusion and the second locking hole are disengaged from each other.

16. The pull strap connector assembly according to claim 13, wherein the mating connector further comprises a terminal fixing block and the mating terminals are fixed on the terminal fixing block; the mating housing comprises a terminal accommodating groove, the terminal fixing block comprises a plurality of first engaging portions, the terminal accommodating grooves comprises a plurality of second engaging portions, the first engaging portions and the second engaging portions are engaged with each other so that the terminal fixing block is fixed in the terminal accommodating groove.

17. The pull strap connector assembly according to claim 13, wherein the ejector rod comprises a groove portion, the groove portion has a first blocking wall and a second blocking wall which oppositely faces the first blocking wall, the second locking protrusion protrudes from the first blocking wall toward the second blocking wall, and the second locking protrusion is spaced from the second blocking wall by a distance.

18. The pull strap connector assembly according to claim 13, wherein the main body comprises a fixing plate located between the first end wall and the second end wall, the fixing plate comprises a pull strap groove and a pull strap shaft located between an edge of the fixing plate and the pull strap groove; and wherein the pull strap extends from a connection between the pull strap and the movable component along the front-back direction to pass through the pull strap groove, and the pull strap wrap around the pull strap shaft, and extends out of the main body.

19. The pull strap connector assembly according to claim 13, wherein the pull strap connector further comprises a pin fixed to the insulating housing, wherein the ejector rod comprises a limiting groove, the pin is fixed to the insulating housing and in the limiting groove, and the dimension of the limiting groove is greater than the dimension of the corresponding pin along the front-back direction.

20. The pull strap connector assembly according to claim 13, wherein the main body defines a receiving space extending through the first end wall, a first receiving groove located on a side of the receiving space, and a second receiving groove located on an another side of the receiving space, the first receiving groove and the second receiving groove extend through the second end wall along the front-back direction; and wherein the base is received in the receiving space, the ejector rod comprise a first ejector rod extending from a side of the base and a second ejector rod extending from an another side of the base, the first ejector rod is at least partially accommodated in the first receiving groove except a rear end of the first ejector rod extends out of the first receiving groove, the second ejector rod is at least partially accommodated in the second receiving groove except a rear end of the second ejector rod extends out of the second receiving groove.

* * * * *